(12) United States Patent
Piper et al.

(10) Patent No.: US 12,717,085 B2
(45) Date of Patent: Aug. 25, 2026

(54) OPTICAL DEVICE

(71) Applicant: Snap Inc., Santa Monica, CA (US)

(72) Inventors: Roland Piper, London (GB); Arseny Alexeev, Drayton (GB)

(73) Assignee: Snap Inc., Santa Monica, CA (US)

( * ) Notice: Subject to any disclaimer, the term of this patent is extended or adjusted under 35 U.S.C. 154(b) by 362 days.

(21) Appl. No.: 18/256,608

(22) PCT Filed: Dec. 7, 2021

(86) PCT No.: PCT/EP2021/084660
§ 371 (c)(1),
(2) Date: Jun. 8, 2023

(87) PCT Pub. No.: WO2022/122766
PCT Pub. Date: Jun. 16, 2022

(65) Prior Publication Data

US 2024/0036257 A1 Feb. 1, 2024

(30) Foreign Application Priority Data

Dec. 10, 2020 (EP) .................................... 20213031

(51) Int. Cl.
*G02B 6/26* (2006.01)
*G02B 27/00* (2006.01)
*G02B 27/01* (2006.01)

(52) U.S. Cl.
CPC ......... *G02B 6/262* (2013.01); *G02B 27/0081* (2013.01); *G02B 27/0172* (2013.01); *G02B 2027/0178* (2013.01)

(58) Field of Classification Search
CPC ........................... G02B 6/262; G02B 27/0081
See application file for complete search history.

(56) References Cited

U.S. PATENT DOCUMENTS 5,402,435 A * 3/1995 Shiono .................. G02B 6/124
372/50.1
10,359,627 B2 7/2019 Wall et al.
(Continued)

FOREIGN PATENT DOCUMENTS

CN 110515209 11/2019
CN 111474813 7/2020
(Continued)

OTHER PUBLICATIONS

"International Application Serial No. PCT/EP2021/084660, International Search Report mailed Mar. 22, 2022", 4 pgs.
(Continued)

*Primary Examiner* — Tina Wong
(74) *Attorney, Agent, or Firm* — Schwegman Lundberg & Woessner, P.A.

(57) ABSTRACT

An optical device for an augmented reality or virtual reality display. A first input diffractive optical element is arranged on a waveguide to receive light from a projector, couple a first portion of the light into the waveguide along a first path, and allow a second portion of the light to pass through. A second input diffractive optical element is arranged to receive the second portion of the light and couple a third portion of the received light along a second path. An output diffractive optical element receives light along the first and second paths and couples the received light out of the waveguide towards a viewer at a first pattern of positions for light along the first path and at a second pattern of positions for light along the second path, providing a first and second plurality of exit pupils corresponding to the first and second pattern of positions.

20 Claims, 11 Drawing Sheets

(56) References Cited

U.S. PATENT DOCUMENTS

| | | | | |
|---|---|---|---|---|
| 10,634,925 | B2 | 4/2020 | Grey et al. | |
| 10,962,787 | B1 * | 3/2021 | Lou | G02B 6/0036 |
| 2010/0214659 | A1 * | 8/2010 | Levola | G02B 6/0035 359/566 |
| 2017/0131545 | A1 | 5/2017 | Wall et al. | |
| 2018/0003994 | A1 | 1/2018 | Grey et al. | |
| 2019/0056591 | A1 * | 2/2019 | Tervo | G02B 6/0038 |
| 2020/0249754 | A1 * | 8/2020 | Morozov | G06F 3/0304 |
| 2020/0333615 | A1 * | 10/2020 | Blomstedt | G02B 6/0016 |

FOREIGN PATENT DOCUMENTS

| | | | |
|---|---|---|---|
| EP | 3175280 | B1 | 4/2018 |
| WO | WO-2008081070 | A1 | 7/2008 |
| WO | 2014091200 | | 6/2014 |
| WO | WO-2016020643 | A1 | 2/2016 |
| WO | 2018003994 | | 1/2018 |
| WO | WO-2020084275 | A1 | 4/2020 |
| WO | WO-2022122766 | A1 | 6/2022 |

OTHER PUBLICATIONS

"International Application Serial No. PCT/EP2021/084660, Written Opinion mailed Mar. 22, 2022", 7 pgs.

"European Application Serial No. 21836069.1, Communication Pursuant to Article 94(3) EPC mailed Apr. 23, 2025", 5 pgs.

"European Application Serial No. 21836069.1, Response to Communication pursuant to Rules 161(1) and 162 EPC filed Jan. 11, 2024", 55 pgs.

"Korean Application Serial No. 10-2023-7020944, Notice of Preliminary Rejection mailed Apr. 28, 2025", w/ English translation, 9 pgs.

"Korean Application Serial No. 10-2023-7020944, Response Filed Jun. 23, 2025 to Notice of Preliminary Rejection mailed Apr. 28, 2025", w/ English Claims, 63 pgs.

"International Application Serial No. PCT/EP2021/084660, International Preliminary Report on Patentability mailed Jun. 22, 2023", 9 pgs.

"International Application Serial No. PCT/EP2021/084660, International Search Report mailed Mar. 22, 2022", 6 pgs.

"International Application Serial No. PCT/EP2021/084660, Written Opinion mailed Mar. 22, 2022", 9 pgs.

"European Application Serial No. 21836069.1, Communication pursuant to Rules 161(1) and 162 EPC mailed Jul. 21, 2023", 3 pgs.

"European Application Serial No. 21836069.1, Response filed Jul. 28, 2025 to Communication Pursuant to Article 94(3) EPC mailed Apr. 23, 2025", w/ English Claims, 53 pgs.

"Chinese Application Serial No. 202180082666.4, Office Action mailed Apr. 24, 2026", w/ English translation, 18 pgs.

* cited by examiner

OPTICAL DEVICE

CLAIM OF PRIORITY

This application is a U.S. national-phase application filed under 35 U.S.C. § 371 from International Application Serial No. PCT/EP2021/084660, filed on Dec. 7, 2021, and published as WO 2022/122766 on Jun. 16, 2022, which claims the benefit of priority to EP Patent Application Serial No. 20213031.6, filed on Dec. 10, 2020, each of which are incorporated herein by reference in their entireties.

TECHNICAL FIELD

The present disclosure relates to optical devices suitable for use in displays such as augmented reality or virtual reality displays. Such optical devices typically comprise a waveguide and diffractive optical elements for coupling light into and out of the waveguide. Virtual reality and augmented reality displays include wearable devices, such as glasses, displays for video games, and screens for military or transportation applications.

BACKGROUND

In a conventional augmented reality display, a transparent display screen is provided in front of a user so that they can continue to see the physical world. The display screen may be a glass waveguide, with a projector that directs light to a surface of the waveguide. The display screen may be provided in a pair of glasses or a window on a vehicle, for example. Light from the projector is coupled into the waveguide by an input diffraction grating. The projected light is totally internally reflected within the waveguide. The light is then coupled out of the waveguide by another diffraction grating so that it can be viewed by a user. The projector can provide information and/or images that augment a user's view of the physical world.

In such displays, the projected light is coupled out of the waveguide as an exit pupil. An exit pupil is a virtual aperture for the projected light on the surface of the waveguide and, in order for the user to see the projected light, the user's eye must be aligned with the exit pupil. The user will typically move their eye to various alignments when observing the physical world through the display screen, and the augmented reality component is desirably available regardless of where the user is looking, within a defined range on the display that is called an eyebox. In order to provide augmented reality images, regardless of the direction of the user's gaze within the eyebox, it is common to provide exit pupil expansion and replication, where multiple exit pupils are coupled towards the user at different points within the eyebox. As the user moves their eye, it becomes aligned with exit pupils at different points on the waveguide, and the augmented reality component remains visible. An example of two-dimensional light expansion techniques, which can be used for exit pupil expansion, is described in WO2016/020643.

Since exit pupils are coupled out at discrete points on the waveguide, it is possible for the user to perceive transitions between exit pupils as they move their eye. Accordingly, it is desirable to ensure that the spacing between the points on the waveguide where an exit pupil is coupled out is kept as small as possible. Ideally the respective surfaces of stacked waveguides will be perfectly parallel, such that each replicated pupil contain identical image data. However, in reality, perfect parallelism does not always exist. It is accordingly desirable, but not essential, that exit pupils overlap rather than exist with gaps therebetween to avoid aberrations in the image perceived by a user.

One possible solution to reduce perception of transitions between exit pupils is to increase the size of each exit pupil. However, this requires a corresponding increase in the size of the input grating and increase in size of the corresponding projector. Space on a waveguide for augmented reality or virtual reality displays is typically tightly constrained, and therefore it is desirable to keep the input grating as small as possible. For this reason, it is desirable to provide a way of reducing spacing between the points on the waveguide where an exit pupil is coupled out, without requiring an increase in the size of each exit pupil.

Another solution previously described in U.S. Pat. No. 10,634,925 B2 comprises using two stacked waveguides, each with a respective input grating and output grating. In each waveguide, light is coupled into the waveguide at the input grating and coupled out of the waveguide at a pattern of positions, to provide a plurality of exit pupils. A separate projector is arranged to direct light to each of the input gratings, and the patterns of positions at which light is coupled out of the waveguide overlap as a combined pattern.

Additionally, it is desirable for an optical device to be as efficient as possible when receiving light from a projector and coupling out the exit pupils. High efficiency diffraction has been achieved in the past by using a blazed or slanted grating structures as the input grating. An example of this can be found in WO 2008081070 A1, which uses blazed or slanted input gratings.

However, there are limits to the efficiency which can be achieved for a grating using known techniques, and it is desirable to provide alternative ways to improve the efficiency of the optical device.

SUMMARY

According to a first aspect, the present disclosure provides an optical device for use in an augmented reality or virtual reality display, comprising:

- a waveguide having first and second surfaces;
- a first input diffractive optical element arranged on the first surface of the waveguide and configured to receive light from a projector, to couple a first portion of the light into the waveguide so that it is captured within the waveguide along a first total internal reflection optical path, and to allow a second portion of the light to pass through;
- a second input diffractive optical element arranged on the second surface of the waveguide and configured to receive the second portion of the light, and to couple a third portion of the received light into the waveguide so that it is captured within the waveguide along a second total internal reflection optical path which is offset from the first total internal reflection optical path; and
- an output diffractive optical element configured to receive light that is captured within the waveguide along the first and second total internal reflection optical paths from the first and second input diffractive optical elements respectively and to couple the received light out of the waveguide and towards a viewer at a first pattern of positions for light received along the first total internal reflection optical path and at a second pattern of positions for light received along the second total internal reflection optical path, to provide a first and second plurality of exit pupils respectively corresponding to the first and second pattern of positions at which light is coupled out of the waveguide.

The first and second patterns of positions at which light is coupled out of the waveguide overlap as a combined pattern. By providing two input diffractive optical elements, a spacing in the combined pattern can be reduced in comparison to the spacing that can be achieved using only one input diffractive optical element.

Optionally, a distance between the first and second surfaces of the waveguides is configured such that a walk length of the first total internal reflection optical path is at least 10% greater than a width of the exit pupils in the first and second plurality of exit pupils, wherein the walk length is a spacing between positions at which the first total internal reflection optical path meets the first surface of the waveguide. Conventionally, the walk length should be no greater than the width of the exit pupils. However, the optical device of the invention provides two overlapping patterns of exit pupils, meaning that a greater walk length can be used without the user perceiving transitions between exit pupils.

Optionally, the second input diffractive optical element is arranged at a position outside (i.e. not in the path of) the first total internal reflection optical path. This prevents additional input optical element interactions where light coupled into the waveguide by the first input diffractive optical element is coupled back out of the waveguide by the second input diffractive optical element as it travels within the waveguide, and increases in-coupling efficiency.

Optionally, a walk length for the first total internal reflection optical path is greater than twice a length of the second input diffractive optical element in a direction parallel to a grating vector of the first input diffractive optical element, wherein the walk length is a spacing between positions at which the first total internal reflection optical path meets the first surface of the waveguide. This further increases in-coupling efficiency.

Optionally, the lengths of the first and second input diffractive optical elements, in a direction parallel to the grating vector of the first input diffractive optical element, are not equal. This further decreases the chance of double input interaction and increases total in-coupling efficiency.

Optionally, the first input diffractive optical element and second input diffractive optical element are configured such that the first portion and third portion of the received light have substantially equal energy. This means that adjacent exit pupils have substantially uniform brightness, and individual exit pupils are less likely to be noticeable to the user.

Optionally, the first diffractive optical element and second input diffractive optical element are configured such that the sum of an energy of the first portion and an energy of third portion of the received light is maximised. This means that light is delivered to an augmented reality or virtual reality display as efficiently as possible, and the power consumption of a projector can be reduced.

Optionally, the first input diffractive optical element and second input diffractive optical element are configured such that a spatial distribution of energy within each exit pupil of the first and second pluralities of exit pupils is substantially uniform. This means that any internal structure to each individual exit pupil is reduced and so less likely to be noticeable to the user.

Optionally, the second input diffractive optical element comprises a reflective layer. A reflective layer prevents light from passing straight through the optical device without coupling to either of the first and second diffractive optical elements, and thereby increases in-coupling efficiency.

Optionally, the output diffractive optical element comprises a two-dimensional grating pattern configured for exit pupil expansion, wherein the exit pupil expansion comprises: the output diffractive optical element receiving light that is captured within the waveguide along the first and second total internal reflection optical paths from the first and second input diffractive optical elements; the output diffractive optical element, for each of the first and second total internal reflection optical paths, diffracting a portion of the captured light into one or more additional total internal reflection optical paths within the waveguide; and the output diffractive optical element coupling the received light out of the waveguide and towards a viewer at a first two-dimensional pattern of positions for light received along the first total internal reflection optical path and a second two-dimensional pattern of positions for light received along the second total internal reflection optical path to provide the first and second plurality of exit pupils corresponding to the positions at which light is coupled out of the waveguide. Exit pupil expansion increases the size of the eyebox in which a viewer can see an augmented reality component or image provided by the projector.

Optionally, the device further comprises an intermediate diffractive optical element configured for exit pupil expansion, wherein the exit pupil expansion comprises: the intermediate diffractive optical element receiving light that is captured within the waveguide along the first and second total internal reflection optical paths from the first and second input diffractive optical elements; and the intermediate diffractive optical element, for each of the first and second total internal reflection optical paths, diffracting a portion of the captured light into one or more additional total internal reflection optical paths within the waveguide; the output diffractive optical element receiving light that is captured within the waveguide along the first and second total internal reflection optical paths and also receiving light that is captured within the waveguide along the one or more additional total internal reflection optical paths; and the output diffractive optical element coupling the received light out of the waveguide and towards a viewer at the first pattern of positions for light received along the first total internal reflection optical path, the second pattern of positions for light received along the second total internal reflection optical path, and one or more respective additional patterns of positions for light received along the one or more additional total internal reflection optical paths, to provide the first, the second and one or more additional pluralities of exit pupils corresponding to the positions at which light is coupled out of the waveguide. Exit pupil expansion increases the size of the eyebox in which a viewer can see an augmented reality component or image provided by the projector.

Optionally, the optical device further comprises a third input diffractive optical element arranged between the first and second input diffractive optical elements and configured to receive the second portion of the light, to couple a fourth portion of the light into the waveguide so that it is captured within the waveguide along a third total internal reflection optical path, and to allow a fifth portion of the light to pass through to be received by the second input diffractive optical element, wherein the output diffractive optical element is additionally configured to receive light that is captured within the waveguide along the third total internal reflection optical path from the third input diffractive optical element and to couple the received light out of the waveguide and towards a viewer at a third pattern of positions for light received along the third total internal reflection optical path, to provide a third plurality of exit pupils corresponding to the third pattern of positions at which light is coupled out of the waveguide.

Optionally, the first input diffractive optical element is configured to receive the light from the projector from a direction that is in a range of ±10° to perpendicular to a plane of the waveguide.

According to a second aspect, the present disclosure provides an optical system for use in an augmented reality or virtual reality display, comprising: an optical device according to any preceding claim; and a projector configured to project light towards the first input diffractive optical element.

Optionally, the projector is a laser projector. Laser projectors have naturally narrow spectra and small pupils which will therefore be well defined and small. Increasing the number of exit pupils would particularly benefit a waveguide combiner display which utilises a laser projector.

DETAILED DESCRIPTION

Figure 1:
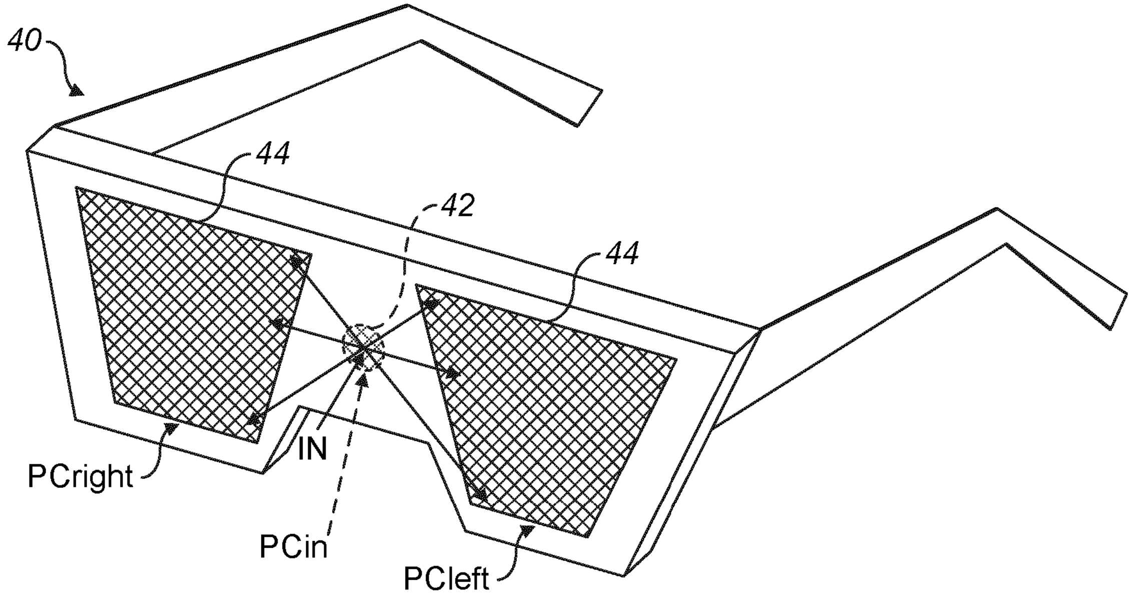
FIG. 1 is a general illustration of an augmented reality display in which an optical device may be used.

An example of a normal augmented reality set-up is illustrated in FIG. 1, in the form of wearable glasses 40.

In the normal augmented reality set-up, a transparent display screen 44 is provided in front of a user so that they can continue to see the physical world. The transparent display screen 44 may comprise one screen for each of the user's eyes. The display screen is typically a glass waveguide, and a projector is provided to one side. Light from the projector is coupled into the waveguide by a diffraction grating (an input grating 42). The projected light is totally internally reflected within the waveguide. The light is then coupled out of the waveguide by another diffraction grating (output grating) so that it can be viewed by a user. The projector can provide information and/or images that augment a user's view of the physical world.

Figure 2:
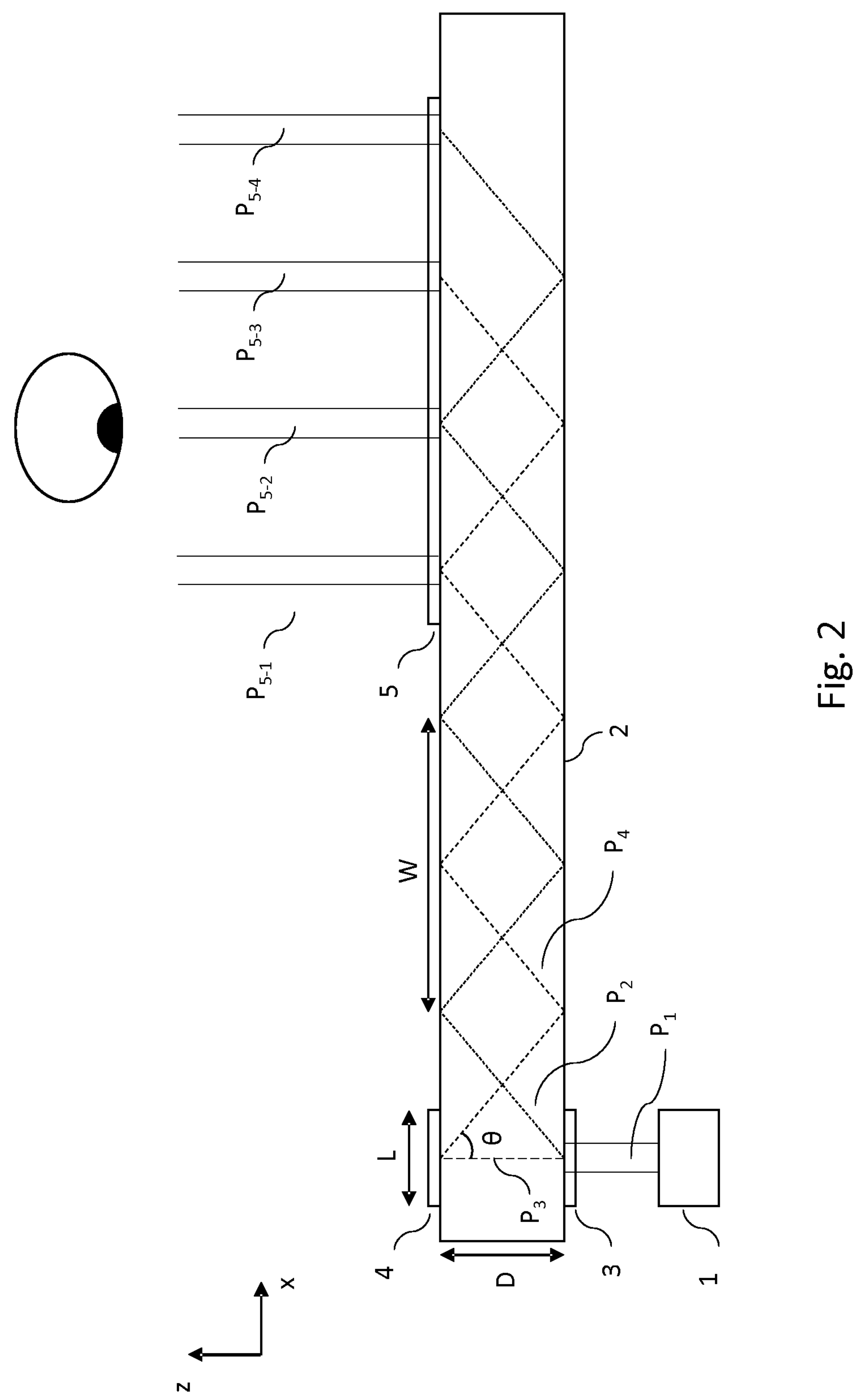
FIG. 2 is a schematic cross-section of an optical device according to the invention.
Figure 3:
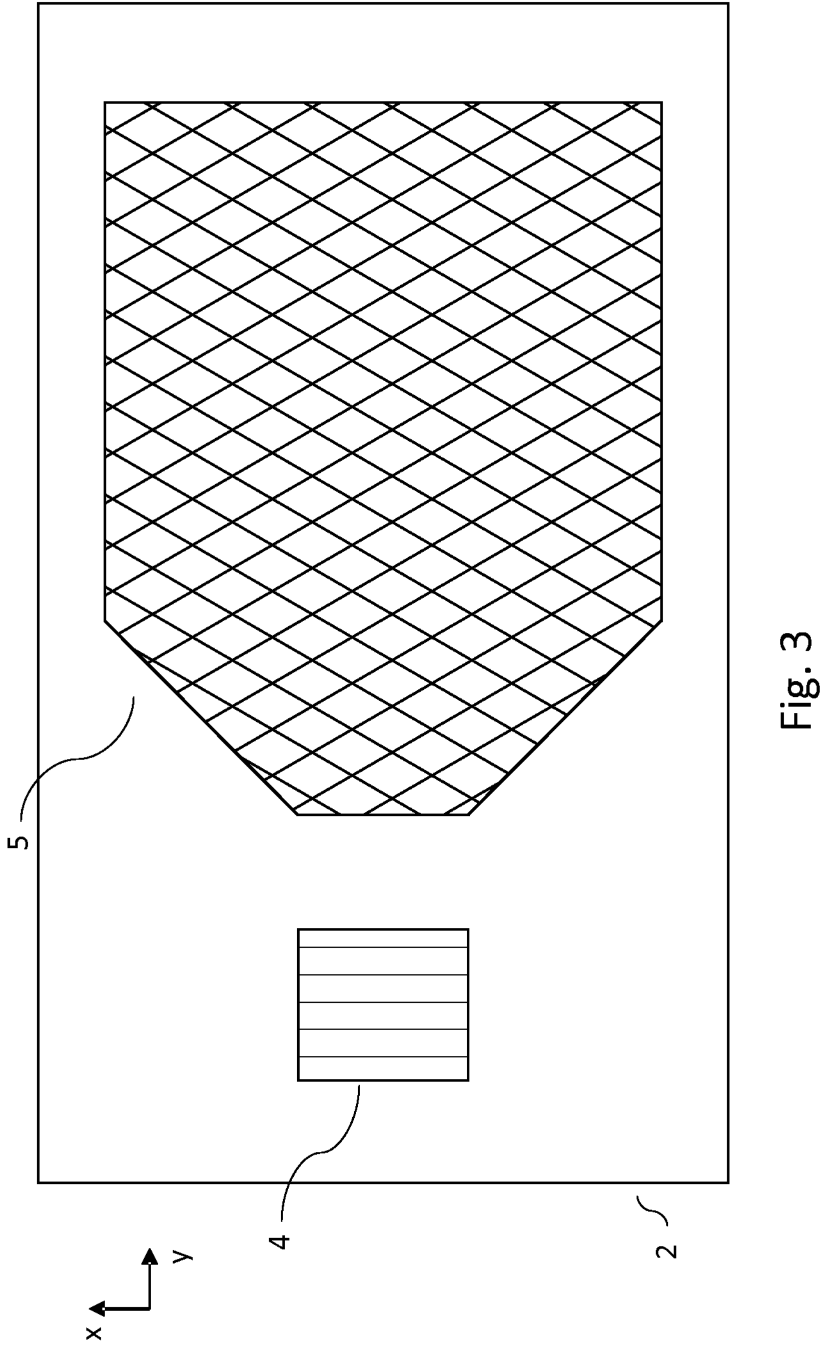
FIG. 3 is a schematic top view of the optical device shown in FIG. 2.

FIG. 2 is a schematic cross-section of an optical device according to the invention, and FIG. 3 is a schematic top view of the optical device shown in FIG. 2, looking along the negative 'z' direction labelled in FIG. 2.

In FIG. 2, a beam of light entering and exiting the optical device is illustrated, containing a spatial distribution of light that will ultimately be perceived as the image of a point by the user. For simplicity, single ray paths are illustrated within the waveguide 2, although it should be understood that the beams of light would still usually be present, in a diffracted form, within the waveguide 2.

The optical device comprises a waveguide 2, a first input diffractive optical element (DOE) 3, a second input DOE 4 and an output DOE 5. Additionally illustrated is a projector 1, which is separate from the optical device.

The projector 1 may for example be configured to project a 2D image that is to be displayed by the optical device as an augmented reality component added to a background which is naturally visible by looking through the optical device.

The projector 1 may use any type of light source such as laser, light emitting diode (LED), Mini-LED, microLED and so on. The projector may also comprise a system for controlling a combination of light wavelengths or polarizations, such as a liquid crystal in silicon (LCOS) system.

The invention is particularly applicable where the projector is a laser projector because the spectrum used by a laser projector is necessarily narrow band and the pupil formed by a laser projector is necessarily small so will produce small exit pupils that have both clear edges and relatively large gaps between them.

The waveguide 2 in this example is a planar substrate which guides light by total internal reflection between two planar surfaces. For example, the substrate may be a transparent glass or polymer. The waveguide may additionally or alternatively comprise a gap between two substrates.

The waveguide 2 is preferably substantially uniform with a thickness D between the first and second planar surfaces. The first and second planar surfaces may be major surfaces that are substantially larger than connecting edges (minor surfaces) of a substantially thin planar shape. In other words, the lengths of the first and second planar surfaces are generally much greater than the thickness D.

The waveguide 2 may generally have one or more bends or corners configured to guide light along an optical path of total internal reflection (TIR) between the input DOEs 3, 4 and the output DOE 5. The waveguide 2 may also be flexible so that it can conform to a curved surface as found in some near-eye displays.

The first input DOE 3 is arranged on a first surface of the waveguide 2. The first input DOE 3 is an optical element capable of coupling light into the waveguide 2 with less than 100% efficiency, to capture a first portion of light incident on the first input DOE 3.

For example, the first input DOE 3 may comprise a linear diffraction grating formed on or cut into the waveguide 2. A linear diffraction grating has a grating vector which has a direction that is perpendicular to the lines or grooves of the grating. When the linear diffraction grating diffracts light, a direction of the light changes by a component parallel to the grating vector.

The second input DOE 4 may be similar in construction to the first input DOE 3. The second input DOE 4 is arranged on a second surface of the waveguide 2 opposing the first surface on which the first input DOE 3 is arranged. Specifically, the second input DOE 4 is arranged to receive light that has passed through the first input DOE 3 without being coupled (redirected) into the waveguide.

In this example, the first and second input DOEs 3, 4 have parallel grating vectors and each have a length L parallel to the grating vector along the respective surface of the waveguide 2. The direction of the grating vectors and the lengths L is labelled as the 'x' direction in FIG. 2.

In some embodiments, the second input DOE 4 may comprise a reflective layer, such as a coating, to prevent light from passing straight through the second input DOE 4 and out of the optical device. Providing a reflective coating can increase the efficiency with which light is coupled into the waveguide 2 at the second input DOE 4. The coating could for example comprise a metal such as silver.

The output DOE 5 is configured to receive light that is captured within the waveguide along the first and second total internal reflection optical paths and to couple light out of the waveguide and towards a viewer at a plurality of positions. This provides a plurality of exit pupils corresponding to the positions at which light is coupled out of the waveguide.

The output DOE 5 may comprise a one- or two-dimensional diffraction grating. A two-dimensional diffraction grating is preferred in order to provide two-dimensional exit pupil expansion. A two-dimensional diffraction grating is equivalent to multiple superimposed linear diffraction gratings with different grating vectors, and can be described in terms of at least two grating vectors with different directions.

Where the output DOE 5 has a two-dimensional grating pattern at least three different interaction outcomes are possible for light interacting with the output DOE 5: a zero-order which continues to propagate within the waveguide 2, captured under total internal reflection, a first order diffraction which remains captured within the waveguide 2, and a first order diffraction that couples light out of the waveguide. More specifically, the output DOE 5 receives light that is captured within the waveguide 2 along a total internal reflection optical path and, each time light following the optical path meets the output DOE 5, one portion of the light continues on its existing path by reflection, one portion of the light is coupled out of the waveguide 2 to provide an exit pupil, and a further portion of the light is diffracted into an additional total internal reflection optical path within the waveguide 2. The additional total internal reflection optical path is not parallel to the previous optical path, and so the combined effect of these three possible interactions is a two-dimensional pattern of positions at which light is coupled out of the waveguide 2.

The output DOE 5 may, for example, comprise a surface grating arranged on the first or second surface of the waveguide 2, or a photonic crystal configured as a diffraction grating, for example as described in patent publication EP317528061.

In order to use the optical device, the projector 1 is arranged to provide light along a received optical path $P_1$ that is received by the optical device and that is incident on the first input DOE 3. The incident light comprises an augmented reality component which can be viewed by the user using any of the exit pupils provided by the output DOE 5.

The first input DOE 3 is configured to receive the light from the projector 1, to couple a first portion of the light into the waveguide. The first portion of the light is thus captured within the waveguide 2 due to total internal reflection, and follows a first total internal reflection optical path $P_2$. Within the plane of the waveguide 2, an initial direction of the first total internal reflection optical path $P_2$ is parallel to the grating vector of the first input DOE 3. The first input DOE 3 does not couple all of the incident light, and also allows a second portion of the light to pass through without being coupled (redirected) into the waveguide 2, propagating in its original direction (e.g. the positive 'z' direction labelled in FIG. 2) along an optical path $P_3$ towards the second input DOE 4. The light may be received at an original direction of 90° to the first surface of the waveguide, as shown in FIG. 2, but the optical device is preferably configured to receive light from a range of angles.

The second input DOE 4 is configured to receive the second portion of the light, and to couple a third portion of the received light (i.e. couple at least part of the second portion) into the waveguide 2. The third portion of the light is thus captured within the waveguide due to total internal reflection, and follows a second total internal reflection optical path $P_4$. Within the plane of the waveguide 2, an initial direction of the second total internal reflection optical path $P_4$ is parallel to the grating vector of the second input DOE 4. The grating vectors of the first and second input DOEs 3, 4 are preferably parallel so that the corresponding total internal reflection optical paths $P_2$, $P_4$ follow similar routes to the output DOE 5.

Each time light following the first or second total internal reflection optical path meets the output DOE 5, a portion of the light following the optical path is coupled out of the waveguide 2, providing an exit pupil of light travelling along an optical path $P_{5-1}$, $P_{5-2}$, etc. towards a possible position and orientation of the user's eye. The remaining light continues following the total internal reflection optical path $P_2$ or $P_4$, and meets the output DOE 5 at further position(s) across the area of output DOE 5. This provides a pattern of out-coupling positions, and a corresponding plurality of exit pupils.

The second total internal reflection optical path is offset from the first total internal reflection optical path. As shown in FIG. 2, this offset can be described as a 'phase offset' between total internal reflection cycles within the waveguide 2 between the first and second surfaces. The length W of a total internal reflection cycle, also called a walk length, is labelled illustratively for the first total internal reflection optical path in FIG. 2, and can defined as the distance between points at which the optical path meets the first surface of the waveguide 2 or, equally, the distance between points at which the optical path meets the second surface of the waveguide 2. Geometrically the first and second total internal reflection optical paths follow sawtooth profiles in the waveguide 2, and these respective sawtooth profiles are preferably out of phase with one another by 180°. This offset between the first and second total internal reflection optical paths leads to an offset between positions at which light following the first and second total internal reflection paths interacts with the output DOE 5, and thus an offset between a first pattern of positions at which light following the first total internal reflection optical path is coupled out of the waveguide 2, and a second pattern of positions at which light following the second total internal reflection optical path is coupled out of the waveguide 2. The first and second patterns overlap with each other to provide a combined pattern of out-coupling positions and corresponding exit pupils. Preferably the 'phase offset' is 180° such that a spacing between exit pupils of the combined pattern is halved along the x-direction, by comparison to the exit pupils provided from a single total internal reflection optical path.

Figure 4B:
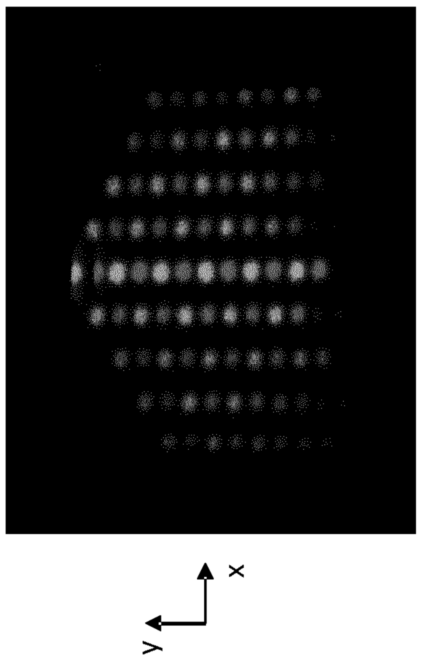
FIGS. 4A and 4B are illustrations of light output from a prior art optical device and light output from an optical device according to the invention.
Figure 4A:
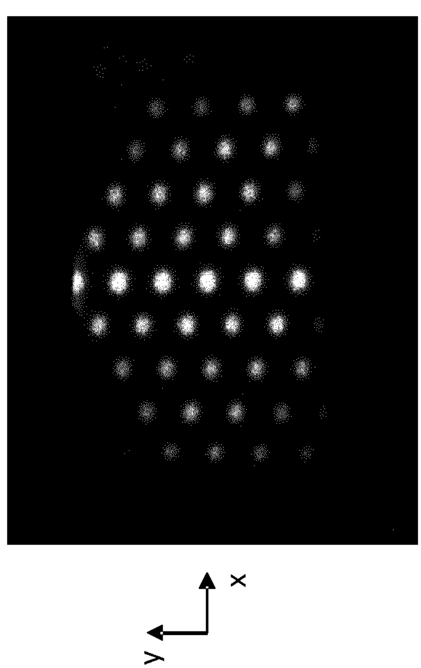

FIGS. 4A and 4B are illustrations of light output from a prior art optical device that has only one input diffractive optical element (such as described in patent publication EP3175280B1) and light output from an optical device as described above with first and second input diffractive optical elements. Each illustration comprises a pattern of bright spots at positions where light is coupled out by an output DOE.

Referring to FIG. 4A, light output by a prior art optical device comprises a first pattern of spots (corresponding to exit pupils). The two dimensional grid pattern of spots in FIG. 4A can be achieved using a two-dimensional grating for the output DOE. For example, where the output DOE comprises two crossed gratings with a relative angle of 60 degrees, the pattern of spots is arranged as a hexagonal grid.

The pattern of pupils shown in FIG. 4A has gaps between spots that may be perceived by a human viewer. On the other hand, referring to FIG. 4B, the combination of the first and second input DOEs 3, 4 has the effect of doubling the density of locations at which light is coupled out, in the combined pattern, and thereby decreasing the perception of distinct pupils in the pattern by a viewer.

Furthermore, in cases where it was already possible to minimise spacing between exit pupils with a single input DOE, by increasing the size of each spot, the second input DOE 4 can be used to decrease the required area for the input DOEs. More specifically, the size of each spot providing an exit pupil at the output DOE 5 corresponds to the size of an entrance pupil provided at the input DOE. In order to increase the size of each spot, the input DOE must be enlarged. On the other hand, with the second input DOE 4 provided by the invention, it is possible to minimize spacing with a reduced spot size, and therefore to reduce the size of the input DOEs in terms of area on the plane of the optical device.

As shown in FIG. 4B, the first and second patterns of positions at which light is coupled out may be associated with different brightness due to different amounts of light being coupled by the first input DOE 3 and by the second input DOE 4. This may be perceptible as banding as a user's eye moves between seeing adjacent exit pupils. As a result, it is preferable to configure the first and second input DOEs 3, 4 to reduce a difference in the amount of light coupled into the waveguide by the first input DOE 3 and the amount of light coupled into the waveguide by the second input DOE 4.

Additionally, the first and second input DOEs 3, 4 are preferably designed to operate efficiently to couple as much light as possible into the waveguide, so that a power requirement for the projector 1 can be minimised, while providing an adequate brightness for the exit pupils.

However, maximising total efficiency may conflict with achieving equal brightness in each total internal reflection optical path. For example, referring to FIG. 2, if first input DOE 3 and second input DOE 4 are both configured to achieve a diffraction efficiency of 70%, then the first input DOE 3 diffracts 70% of the energy of received optical path $P_1$ into the first total internal reflection optical path $P_2$ and 30% of the energy passes through to be received by the second input DOE 4. The second input DOE 4 then diffracts 70% of the received 30% (21% of the energy of received optical path $P_1$ into the second total internal reflection optical path $P_4$). This means that the energy in optical path $P_{5-2}$ may be at least three times higher than the energy in optical path $P_{5-3}$, and this difference in energy may be noticeable to the user when viewing the corresponding exit pupils.

As a result, it may be preferable to tune the efficiency of the first and second input DOEs 3, 4 to achieve maximum total efficiency within the constraint of substantially equal brightness for the exit pupils. For example, if the first input DOE 3 is configured to achieve a diffraction efficiency of 30% and the second input DOE 4 is configured to achieve a diffraction efficiency of 40% then 30% of the energy of received optical path $P_1$ will be distributed in the first plurality of exit pupils and 28% of the energy of received optical path $P_1$ will be distributed in the second plurality of exit pupils, giving approximately equal brightness.

More generally, efficiency of each input DOE can be configured using known techniques for a single grating, such as modifying grating height, grating material, refractive index, aspect ratio or blaze angle, among others.

Figure 5:
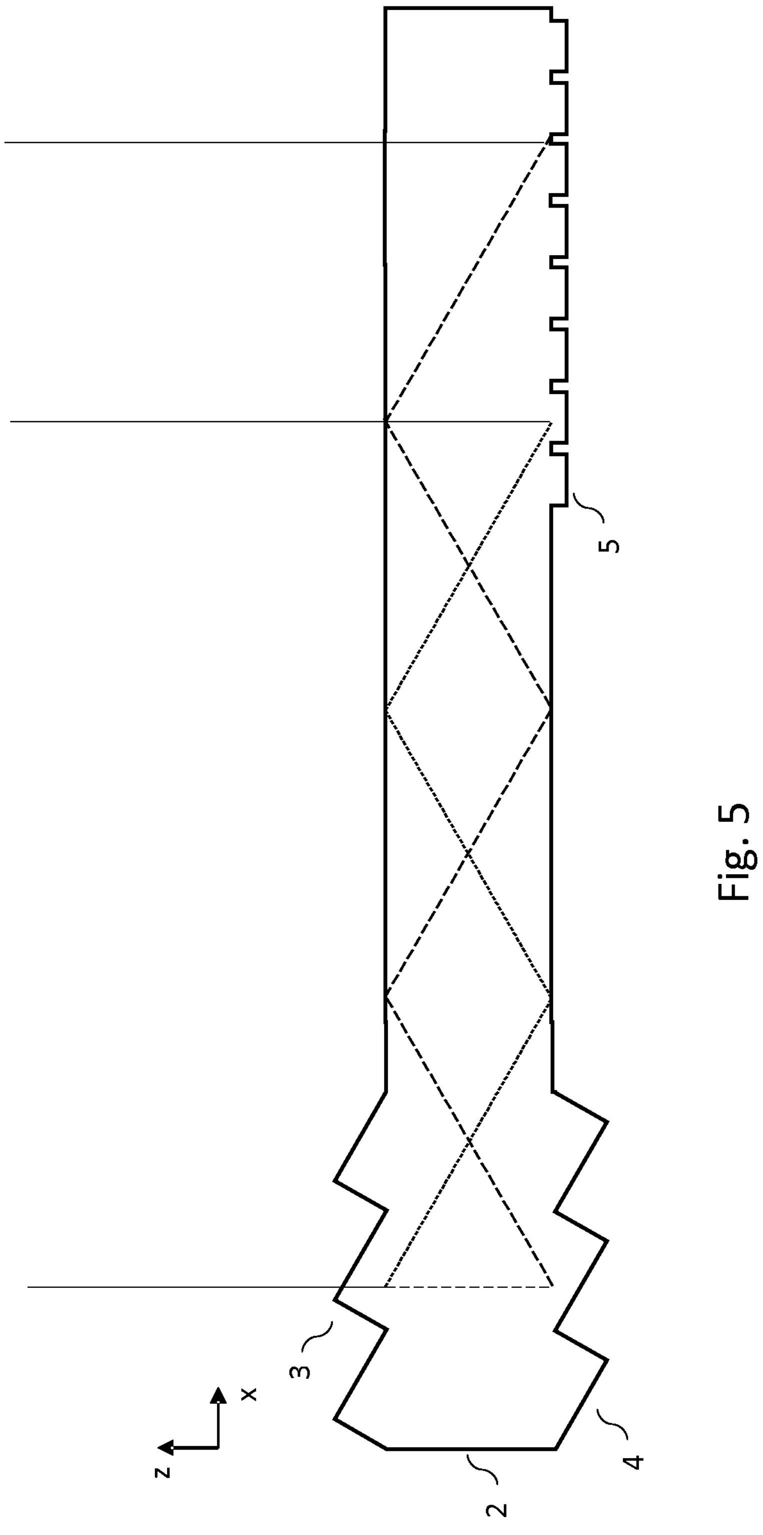
FIG. 5 is a schematic cross-section of another optical device according to the invention.

FIG. 5 schematically illustrates a cross-section of an optical device according to the invention which includes one efficiency improvement. As shown in FIG. 5, the first and second input DOEs 3, 4 may be configured as blazed gratings on the first and second surfaces of the waveguide 2, in order to increase the efficiency of coupling light into the waveguide at each input DOE.

However, the combination of first and second DOEs in this optical device also lends itself to more specific efficiency considerations. More specifically, because there are two input DOEs, it is possible that some light which has been coupled into the waveguide by the first input DOE 3 will follow a total internal reflection optical path that meets the second input DOE 4. A portion of this light may be diffracted again, randomly scattered or absorbed at the second input DOE 4, and thus not follow a suitable path to be coupled out at the output DOE 5 in an exit pupil.

This represents an energy loss and a reduction in efficiency, and therefore it is desirable to decrease the chance of light being coupled twice by the first and second input DOEs 3, 4. In other words, it is desirable to arrange the second input DOE 4 outside of the first total internal reflection optical path (which can be predicted based on the properties of the waveguide 2, the first input DOE 3, the fields of view produced by the light engine, and a wavelength or range of wavelengths of light expected to be received by the first input DOE 3 from the projector 1).

Referring again to FIG. 2, the first and second total internal reflection optical paths initially follow an angle θ which is dictated by the angle of incidence of light received by the optical device and by first order diffraction at the respective diffractive optical elements. The walk length W for each of the total internal reflection optical paths depends upon the thickness D of the waveguide 2, and the angle θ for each of the total internal reflection optical paths.

Extending the walk length W means that light travels further in the plane of the waveguide 2 between interactions with the first and second surfaces. As a result, the likelihood of light interacting with both of the input DOEs 3, 4 can be decreased by any of: increasing the waveguide thickness D, increasing the angle θ of diffracted light, reducing the field of view of the image projected into the waveguide, or decreasing the length L of the input DOEs 3, 4.

Referring to FIG. 2, if the first and second DOEs have the same size and are arranged directly opposite each other, the walk length is preferably configured so that the walk length of each total internal reflection optical path is greater than the length L of the first and second input DOEs 3,4, so that even light which enters the first input DOE 3 at the furthest left (negative 'x' direction) end of the first input DOE 3, and is coupled by the first input DOE 3, travels far enough to the right (positive 'x' direction) before reaching the second surface that it misses and does not interact with the second input DOE 4.

Additionally or alternatively, the efficiency of each input DOE can be designed and tuned (configured) to control a spatial distribution of energy within each total internal reflection optical path and within each exit pupil. This can be used to take into account the possibility of light interacting with an input DOE again after being coupled into the waveguide. In particular, the input DOEs may be designed with strong diffraction efficiency in the R0 (simple reflection) order, such that a second interaction with an input DOE is similar to total internal reflection elsewhere in the waveguide.

Figures 6A, 6B, 6C:
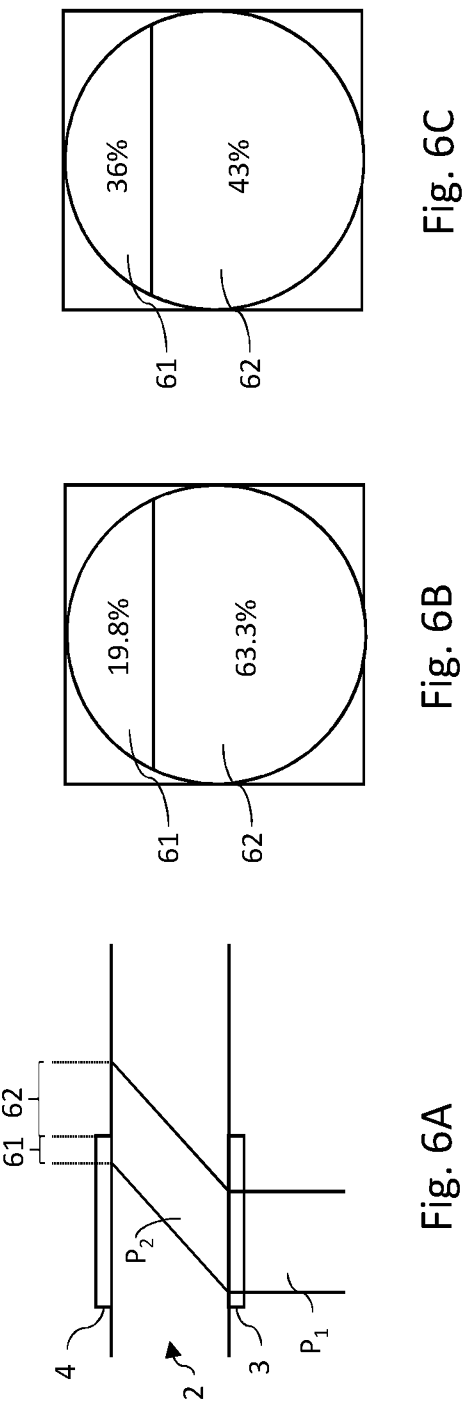
FIGS. 6A, 6B and 6C are diagrams illustrating potential spatial non-uniformity within a pupil.

FIGS. 6A, 6B and 6C illustrate a specific example of this principle.

More specifically, FIG. 6A shows a case in which the first total internal reflection optical path $P_2$ comprises a wide beam, and interacts with the second input DOE 4 in one (left) part of the beam width when interacting with the second surface of the waveguide. The other (right) part of the beam simply undergoes total internal reflection at the second surface.

FIGS. 6B and 6C illustrate spatial distributions of energy within the wide beam.

This difference in interaction leads to a spatially non-uniform distribution of energy in the total internal reflection optical path as illustrated in FIG. 6B. More specifically, in FIG. 6B, the wide beam has a circular shape in which a first part 61 of the circular beam is coupled into the waveguide with 19.8% efficiency after interacting with both of the first and second input DOEs 3, 4, while a second part 62 of the circular beam is coupled into the waveguide with 63.3% efficiency after interacting only with the first input DOE 3.

As shown in FIG. 6C, by increasing the R0 (and T0) order diffraction efficiency of the input DOEs 3, 4 (and thus decreasing the corresponding R1/T1 first order diffraction efficiencies), the energy in the first part 61 of the circular beam is increased to correspond to 36% efficiency after interacting with both of the first and second input DOEs 3, 4. On the other hand, the energy in the second part 62 of the circular beam is decreased to correspond to 43% efficiency after interacting with only the first input DOE 3.

FIG. 7 is a schematic cross-section of a modification of the optical device shown in FIG. 2. The output DOE 5 is not shown in this figure for simplicity.

Figures 7A, 7B:
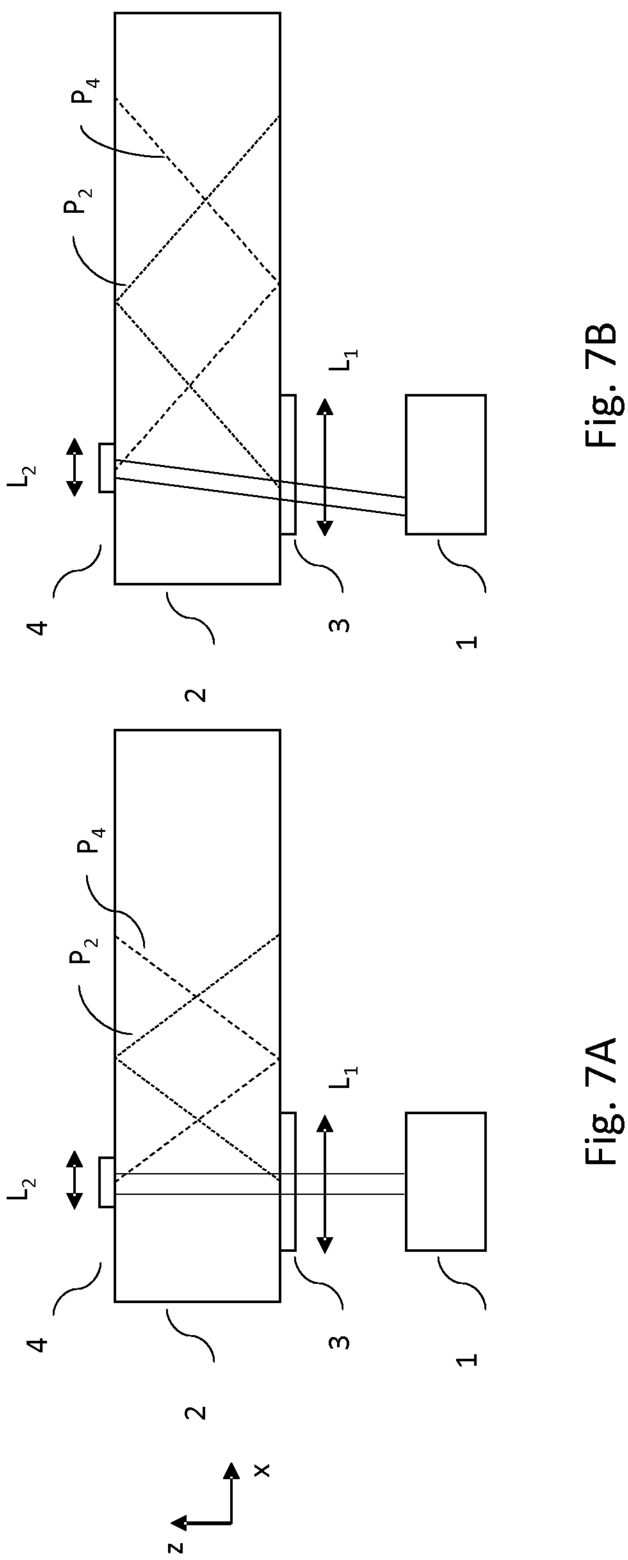
FIGS. 7A and 7B are schematic cross-sections of a part of another optical device according to the invention.

FIG. 7 illustrates a further way to reduce the chance of light being coupled twice by the first and second input DOEs 3, 4. Specifically, the input DOEs 3, 4 may be configured to have different lengths $L_1$, $L_2$ parallel to their respective grating vectors. For example, where the light from projector 1 can be directed from multiple possible directions, as shown in FIGS. 7A and 7B, the second input DOE 4 may have a shorter length $L_2$ than the length $L_1$ of the first input DOE 3. Different received optical paths $P_1$ may be spread over an angular range of light received from the projector 1, to provide an exit pupil in which a user sees a full image. Alternatively, different received optical paths $P_1$ may, for example, be used to tune exit pupil spacing when a width of the projected beam is variable or when the central field of view of the projected image is optically shifted.

Figure 8:
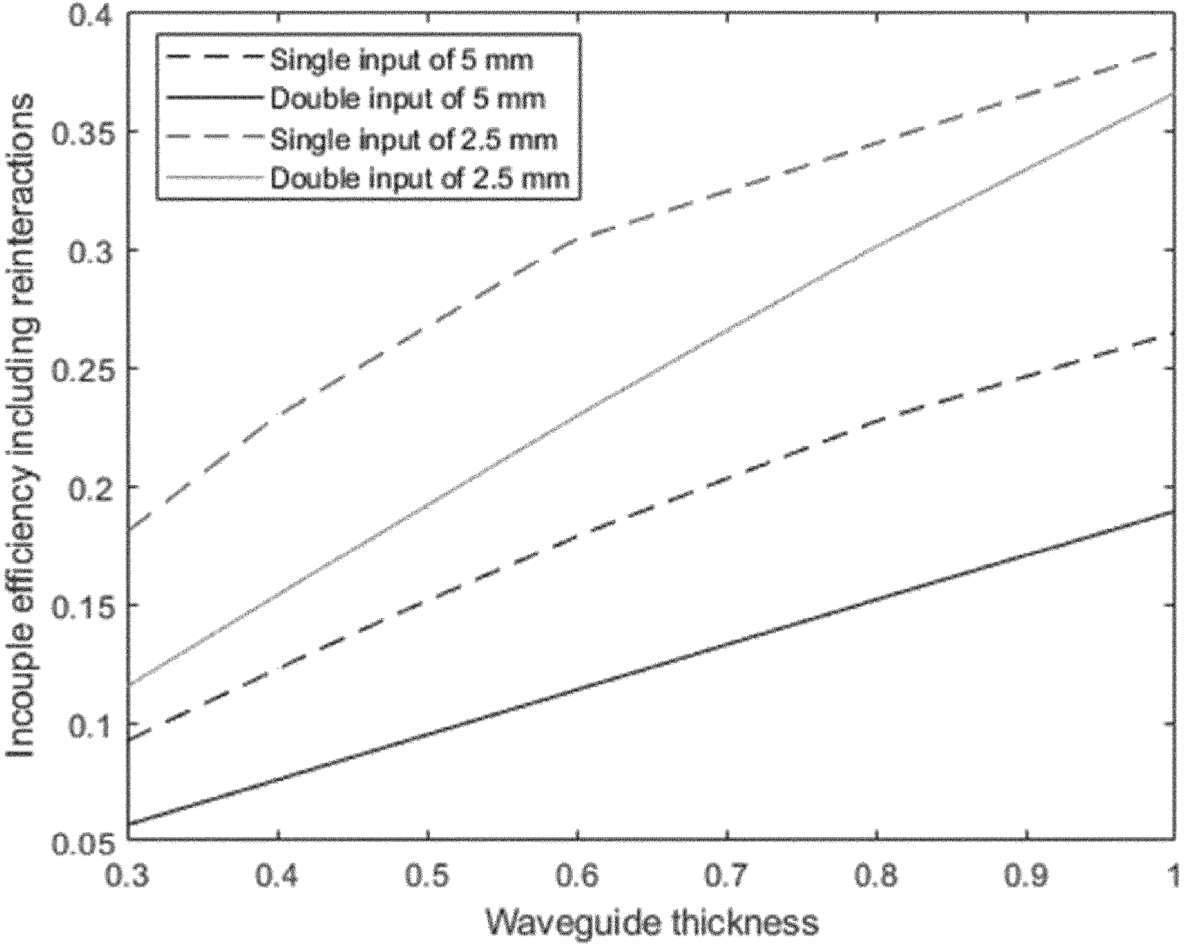
FIGS. 8, 9A and 9B are graphs of efficiency of optical devices constructed according to the invention and of optical devices constructed according to previously known principles.
Figure 9A:
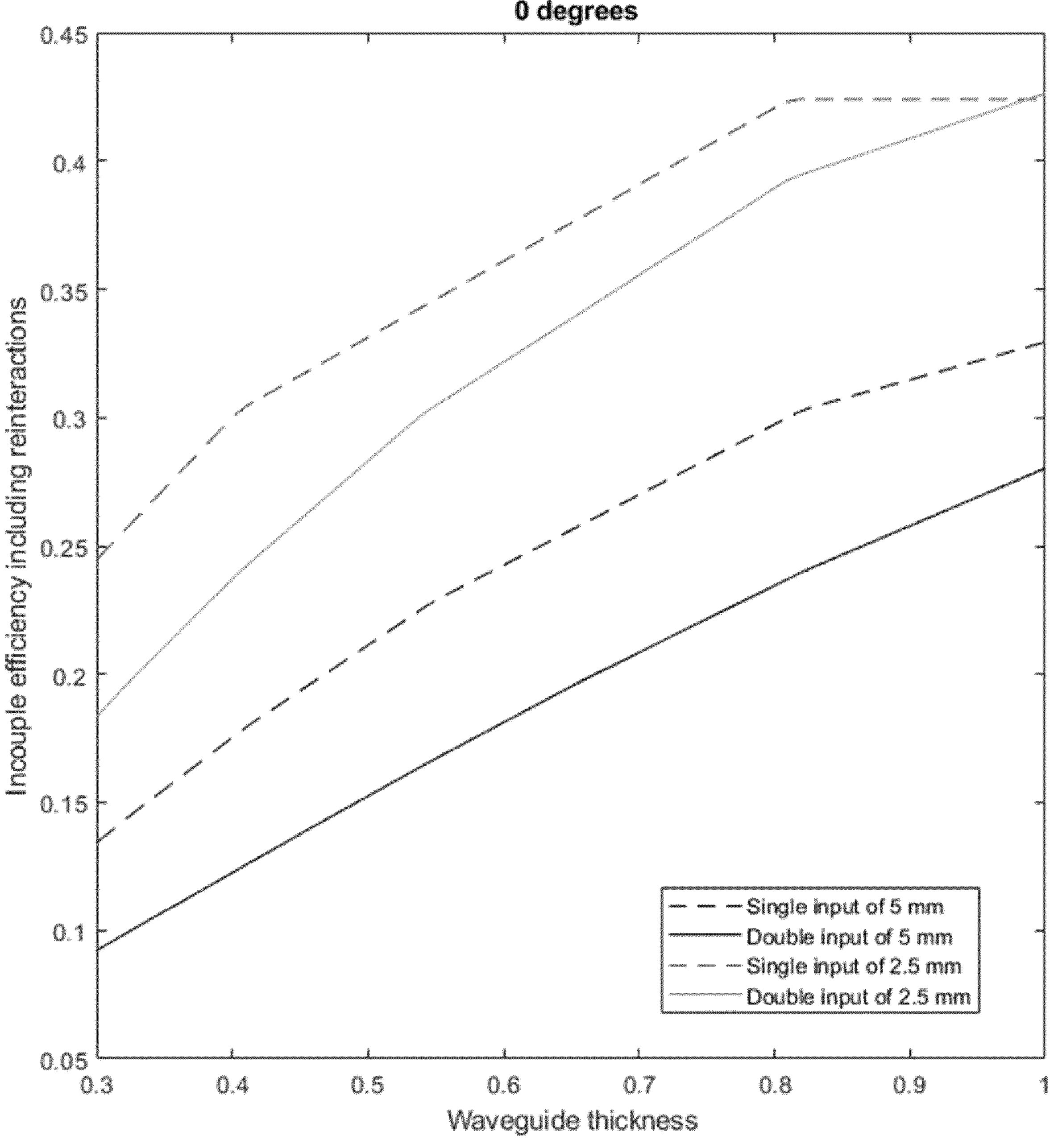
Figure 9B:
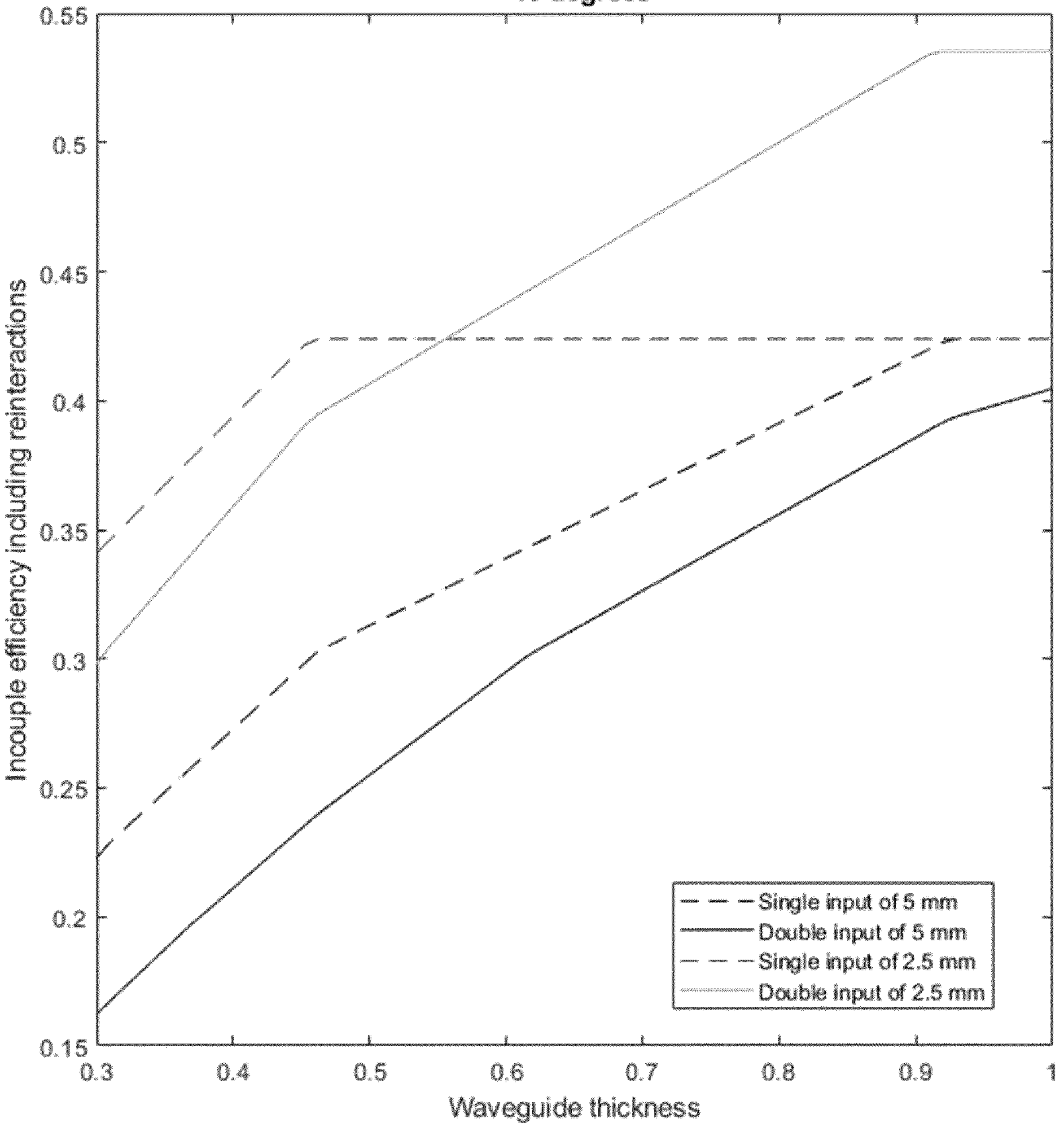

FIGS. 8, 9A and 9B are graphs of efficiency of optical devices constructed according to the invention and of optical devices constructed according to previously known principles. Overall, these graphs demonstrate that the addition of a second input DOE enables the use of input DOEs with smaller area on the plane of the waveguide, and also enables the use of thinner waveguides.

FIG. 8 shows input coupling efficiency comparisons of double input DOE devices (solid lines) according to the invention with single input DOE devices (dashed lines) that are similar apart from omitting the second input optical element 4. Efficiencies were simulated for input gratings with a length L of 5 mm and with a length L of 2.5 mm, respectively. The efficiency scale is absolute (i.e. a value of 1 is 100% efficiency), and the thickness scale is in millimetres.

As described above and shown in FIG. 4B, using a second input DOE in addition to a conventional first input DOE doubles the density of exit pupils. Similarly, doubling the size of each input DOE (and doubling the width of the light beam received from the projector 1) doubles the size of the spots associated with exit pupils. As a result, a single input DOE of 5 mm length and a double input DOE of 2.5 mm length can be used to provide similarly complete coverage of an eyebox, and it is useful to compare the efficiencies for these two cases Referring to FIG. 8, it can be seen that there is a range of waveguide thicknesses in which the double input DOE of length 2.5 mm (i.e. an optical device according to the invention) is more efficient than the single input DOE of length 5 mm, meaning that there is a range of input grating sizes where both the density of exit pupils and the efficiency can be higher than in the conventional single input grating case.

As also shown in FIG. 8, this efficiency improvement also gets larger when the waveguide 2 is configured to be thicker, because the chance of the first portion of the received light (coupled by the first input DOE 3) interacting with the second input DOE 4 is reduced.

Furthermore, in the regime where the walk length W of the first total internal reflection optical path $P_2$ is greater than the length L of the input grating, the double input DOE of the invention is always more efficient than a conventional single input DOE.

Referring again to FIG. 2, the in-coupling efficiency of the combined first and second input DOEs 3, 4 is also dependent on the angle at which light is incident on the first input optical element 3 from the projector 1.

An embodiment of the invention was tested with light incident in a range of ±10° to perpendicular to a plane of the waveguide 2 at the first input DOE 3, though more extreme angles may also be used. The efficiency results shown in FIG. 8 were obtained with light incident at −10° to the vertical (i.e. incident light partly travelling in the negative 'x' direction). FIGS. 9A and 9B show equivalent results with light incident perpendicular to the plane of the waveguide 2 (FIG. 9A) and light incident at +10° to the perpendicular (i.e. incident light partly travelling with the subsequent direction of propagation in the waveguide) (FIG. 9B). For reference, FIGS. 9A and 9B can be understood to correspond to the projection angles in FIGS. 7A and 7B.

Comparing FIG. 9A to FIG. 8, it can be seen that efficiency is higher when light is incident perpendicular to the plane of the waveguide 2 as in FIG. 9A, when compared to light incident against the direction of the total internal reflection optical path in the waveguide due to reinteractions with either input DOE 3, 4.

Additionally, FIG. 9A illustrates that there is an upper limit of efficiency with increasing waveguide thickness D. In the example plot for a single input grating of length 2.5 mm, the efficiency does not increase when the waveguide thickness D is greater than approximately 0.8 times the grating length L, though this value will be different for any other design including changes to DOE pitch, DOE size, waveguide thickness, design wavelength, etc.

Turning to FIG. 9B, light received at a positive angle (i.e. already travelling in the positive 'x' direction of FIG. 2) is the least likely to interact twice with the first and second input DOEs 3, 4 and the 2.5 mm double input grating case for this plot is the most efficient of all of the plots at larger waveguide thickness D.

Figure 10:
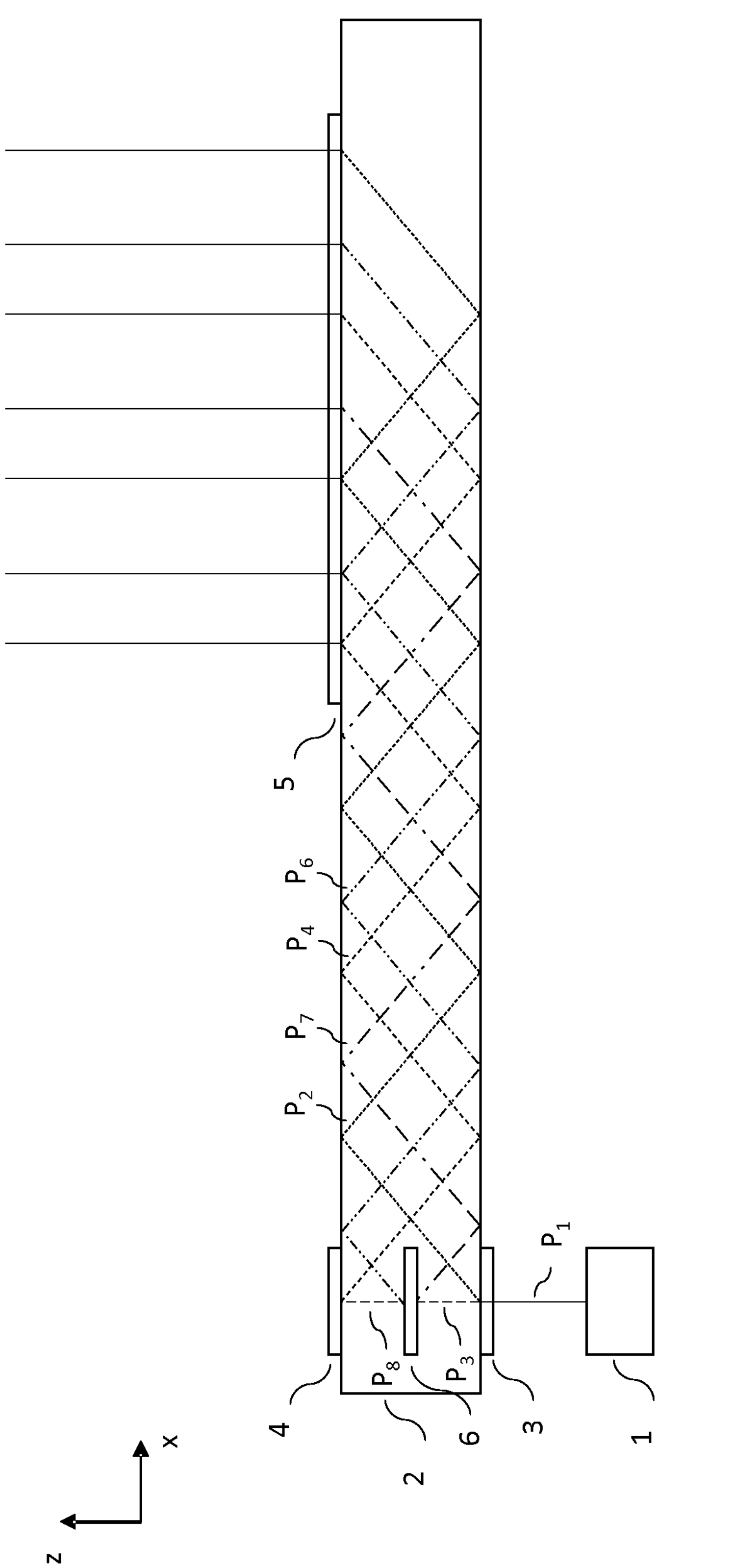
FIG. 10 is a schematic cross-section of another optical device according to the invention.

FIG. 10 schematically illustrates a further development of the optical device shown in FIG. 2. As shown in FIG. 10, in some embodiments, a third input DOE 6 may be arranged between the first and second input DOEs 3, 4. In this embodiment, the third input DOE 6 is configured to receive the second portion of light $P_3$, to transmissively couple a fourth portion of the light into the waveguide 2 so that it is captured within the waveguide 2 along a third total internal reflection optical path $P_6$, to reflectively couple a fifth portion of the light into the waveguide 2 along a fourth total internal reflection optical path $P_7$, and to allow a fifth portion of the light to pass through along an optical path $P_8$ towards the second DOE 4. Adding the third input DOE 6 further increases the number of positions at which light is coupled out of the waveguide by the output DOE 5. For example, the third input optical element may comprise a photonic crystal structure of grating lines embedded in the waveguide, or an input element may be constructed by "sandwiching" gratings between waveguide substrates. More generally, any number of input optical elements may be incorporated between the first and second input DOEs in this way.

In the above-described examples, the output DOE 5 preferably comprises a two-dimensional grating pattern in order to provide a two-dimensional pattern of exit pupils. As an alternative, exit pupil expansion can be performed in a first direction using an intermediate diffractive optical element, and then in a second direction using an output DOE 5 that has a one-dimensional grating. An example of such an intermediate diffractive optical element is described in U.S. Pat. No. 8,160,411 B2. Referring to FIG. 3, for example, the intermediate diffractive optical element may be configured to provide expansion in the 'x' direction, and the output DOE 5 may be configured to provide expansion in the 'y' direction.

In this case, the intermediate DOE is configured to receive light along the first and second total internal reflection optical paths, from the input DOEs 3, 4. The intermediate DOE diffracts a portion of the light following each of the first and second total internal reflection optical paths into one or more additional total internal reflection optical paths that are parallel to the original first and second total internal reflection optical paths. The output DOE 5 then receives light following the first and second total internal reflection optical paths and light following the one or more additional total internal reflection optical paths, and couples the received light out of the waveguide and towards a viewer at a first pattern of positions for light received along the first total internal reflection optical path, a second pattern of positions for light received along the second total internal reflection optical path, and one or more respective additional patterns of positions for light received along the one or more additional total internal reflection optical paths, to provide a combined plurality of exit pupils corresponding to all of the positions at which light is coupled out of the waveguide.

The invention claimed is:

1. An optical device for use in an augmented reality or virtual reality display, comprising:

a waveguide having a first surface and a second surface that is opposite the first surface;

a first input diffractive optical element arranged on the first surface of the waveguide and configured to initially receive light output from a projector, to initially couple a first portion of the light output from the projector into the waveguide through the first surface of the waveguide so that it is captured within the waveguide along a first total internal reflection optical path, and to allow a second portion of the light to pass through the first input diffractive optical element;

a second input diffractive optical element arranged on the second surface of the waveguide and at least partially overlapping the first input diffractive optical element, and configured to receive the second portion of the light that passed through the first input diffractive optical element, and to couple a third portion of the received second portion of the light into the waveguide so that it is captured within the waveguide along a second total internal reflection optical path which is offset from the first total internal reflection optical path; and an output diffractive optical element configured to receive light that is captured within the waveguide along the first and second total internal reflection optical paths from the first and second input diffractive optical elements respectively and to couple the received light out of the waveguide and towards a viewer at a first pattern of positions for light received along the first total internal reflection optical path and at a second pattern of positions for light received along the second total internal reflection optical path, to provide a first and second plurality of exit pupils respectively corresponding to the first and second pattern of positions at which light is coupled out of the waveguide, wherein the second input diffractive optical element is arranged at a position outside the first total internal reflection optical path such that the first portion of light that is initially coupled into the waveguide through the first surface of the waveguide along the first total internal reflection optical path is not incident on the second input diffractive optical element, and the first input diffractive optical element is arranged at a position outside the second total internal reflection optical path such that the third portion of light along the second total internal reflection optical path is not incident on the first input diffractive optical element.

2. The optical device according to claim 1, wherein a distance between the first and second surfaces of the waveguide is configured such that a walk length of the first total internal reflection optical path is at least 10% greater than a width of exit pupils in the first and second plurality of exit pupils, wherein the walk length is a spacing between positions at which the first total internal reflection optical path meets the first surface of the waveguide.

3. The optical device according to claim 1, wherein a walk length for the first total internal reflection optical path is greater than twice a length of the second input diffractive optical element in a direction parallel to a grating vector of the first input diffractive optical element, wherein the walk length is a spacing between positions at which the first total internal reflection optical path meets the first surface of the waveguide.

4. The optical device according to claim 1, wherein lengths of the first and second input diffractive optical elements, in a direction parallel to a grating vector of the first input diffractive optical element, are not equal.

5. The optical device according to claim 1, wherein the first input diffractive optical element and second input diffractive optical element are configured such that the first portion and third portion of the received light have substantially equal energy.

6. The optical device according to claim 1, wherein the first input diffractive optical element and second input diffractive optical element are configured such that a sum of an energy of the first portion and an energy of third portion of the received light is maximised.

7. The optical device according to claim 1, wherein the first input diffractive optical element and second input diffractive optical element are configured such that a spatial distribution of energy within each exit pupil of the first and second pluralities of exit pupils is substantially uniform.

8. The optical device according to claim 1, wherein the second input diffractive optical element comprises a reflective layer.

9. The optical device according to claim 1, wherein the output diffractive optical element comprises a two-dimensional grating pattern configured for exit pupil expansion, wherein the exit pupil expansion comprises:

the output diffractive optical element receiving light that is captured within the waveguide along the first and second total internal reflection optical paths from the first and second input diffractive optical elements;

the output diffractive optical element, for each of the first and second total internal reflection optical paths, diffracting a portion of the captured light into one or more additional total internal reflection optical paths within the waveguide; and the output diffractive optical element coupling the received light out of the waveguide and towards a viewer at a first two-dimensional pattern of positions for light received along the first total internal reflection optical path and a second two-dimensional pattern of positions for light received along the second total internal reflection optical path to provide the first and second plurality of exit pupils corresponding to the positions at which light is coupled out of the waveguide.

10. The optical device according to claim 1, further comprising an intermediate diffractive optical element configured for exit pupil expansion, wherein the exit pupil expansion comprises:

the intermediate diffractive optical element receiving light that is captured within the waveguide along the first and second total internal reflection optical paths from the first and second input diffractive optical elements;

the intermediate diffractive optical element, for each of the first and second total internal reflection optical paths, diffracting a portion of the captured light into one or more additional total internal reflection optical paths within the waveguide;

the output diffractive optical element receiving light that is captured within the waveguide along the first and second total internal reflection optical paths and also receiving light that is captured within the waveguide along the one or more additional total internal reflection optical paths; and the output diffractive optical element coupling the received light out of the waveguide and towards a viewer at the first pattern of positions for light received along the first total internal reflection optical path, the second pattern of positions for light received along the second total internal reflection optical path, and one or more respective additional patterns of positions for light received along the one or more additional total internal reflection optical paths, to provide the first and the second pluralities of exit pupils, and one or more additional pluralities of exit pupils corresponding to the positions at which light is coupled out of the waveguide.

11. The optical device according to claim 1, wherein the first input diffractive optical element is configured to receive the light from the projector from a direction that is in a range of ±10° to perpendicular to a plane of the waveguide.

12. An optical system for use in an augmented reality or virtual reality display, comprising:

an optical device according to claim 1; and a projector configured to project light towards the first input diffractive optical element.

13. An optical system according to claim 12, wherein the projector is a laser projector.

14. The optical device according to claim 1, wherein the first portion of the light along the first total internal reflection optical path is not incident on the second input diffractive optical element.

15. The optical device according to claim 1, wherein each of the first total internal reflection optical path and the second total internal reflection optical path follow respective sawtooth profiles within the waveguide, and the sawtooth profiles of the first total internal reflection optical path and the second total internal reflection optical path are offset from one another by 180 degrees such that a spacing between exit pupils in a combined pattern of the first pattern of positions and the second pattern of positions is halved along a direction parallel to a grating vector of the first input diffractive optical element, relative to a spacing between exit pupils in the first pattern of positions alone.

16. The optical device according to claim 1, wherein the first pattern of positions and the second pattern of positions at which light is coupled out of the waveguide overlap as a combined pattern, and a spacing between adjacent exit pupils in the combined pattern is less than a spacing between adjacent exit pupils in the first pattern of positions alone.

17. The optical device according to claim 1, wherein a grating vector of the first input diffractive optical element and a grating vector of the second input diffractive optical element are parallel to each other.

18. The optical device according to claim 1, wherein at least one of the first input diffractive optical element and the second input diffractive optical element is configured with a zero-order reflection diffraction efficiency that is greater than a first-order diffraction efficiency of the respective input diffractive optical element, such that light coupled into the waveguide by the first input diffractive optical element and subsequently incident on the second input diffractive optical element is reflected by the second input diffractive optical element in a zero-order reflection.

19. The optical device according to claim 7, wherein the reflective layer comprises metal.

20. The optical device according to claim 5, wherein the first input diffractive optical element has a first diffraction efficiency and the second input diffractive optical element has a second diffraction efficiency that is greater than the first diffraction efficiency.

* * * * *